Feb. 3, 1970  C. H. ALLEN  3,493,119
FILTER DISC CONSTRUCTION
Filed Feb. 16, 1968  2 Sheets-Sheet 1

INVENTOR.
Catherine H. Allen
BY John A. Hamilton
Attorney.

United States Patent Office 3,493,119
Patented Feb. 3, 1970

3,493,119
FILTER DISC CONSTRUCTION
Catherine H. Allen, Springfield, Mo., assignor, by mesne assignments, to Allen Filters, Incorporated, Springfield, Mo., a corporation of Missouri
Filed Feb. 16, 1968, Ser. No. 706,069
Int. Cl. B01d 39/12
U.S. Cl. 210—486                                     4 Claims

ABSTRACT OF THE DISCLOSURE

A filter disc comprising a pair of annular rings of sheet filter material secured together around their outer peripheral edges, and an annular spacer member of foraminous material disposed between said rings, said spacer member being taperingly reduced in thickness from its inner to its outer periphery whereby to maintain the inner peripheries of said rings spaced apart in a direction parallel to the axis of said disc, the invention consisting essentially of a special construction of said spacer member.

---

Figures 1, 2:
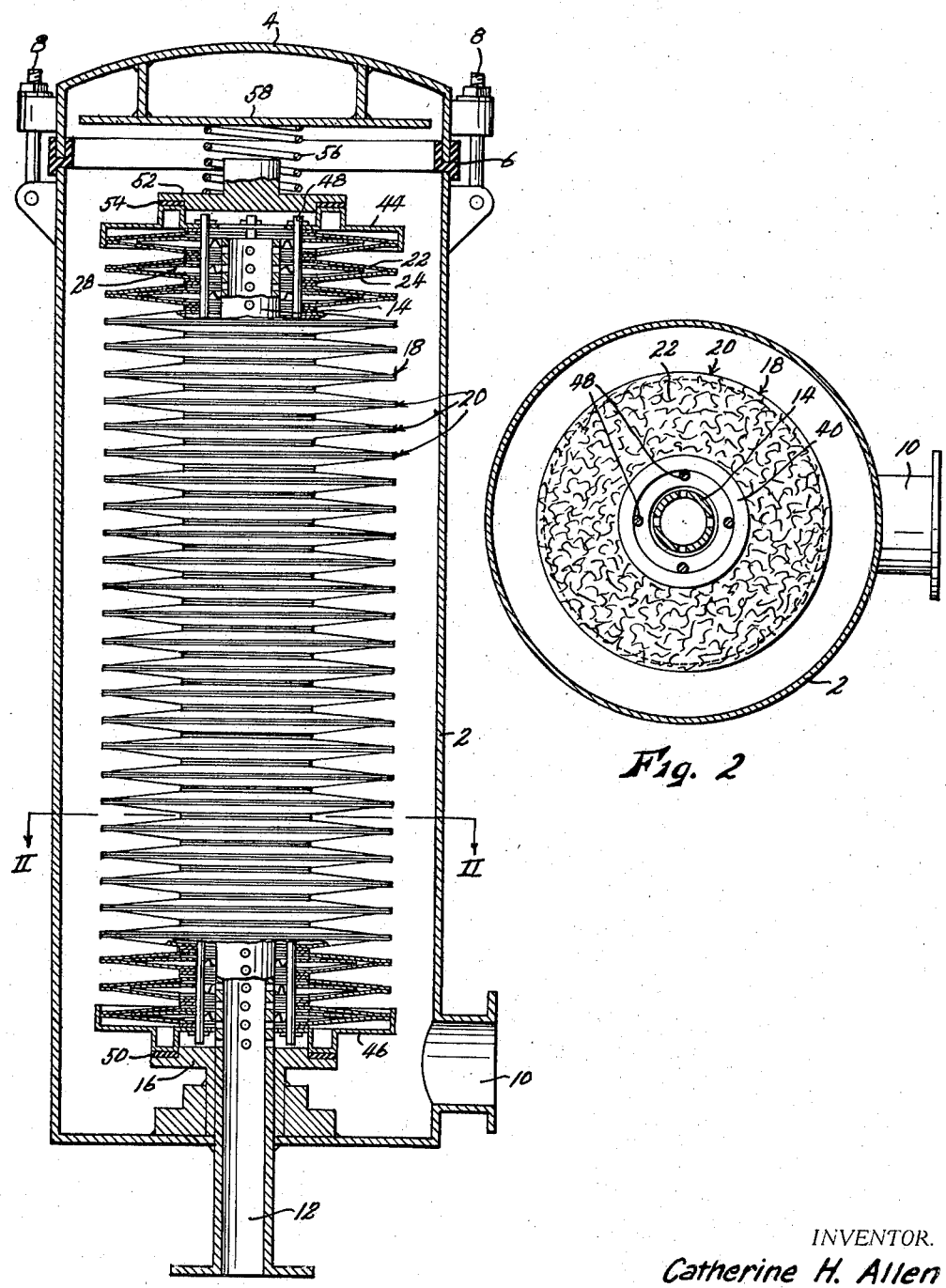

This invention relates to new and useful improvements in oil filter construction, relating more specifically to oil filters of the disc type, and still more specifically to the construction of the individual discs utilized in such filters.

Disc filters in general utilize individual filter discs each consisting of a pair of annular rings of paper, felt or other filter material secured fixedly together around their outer peripheral edges, and having their inner peripheral edges spaced apart in a direction parallel to the axis of the disc, by means of a spacer member interposed between said rings, so that the space between said rings opens into the central aperture of the disc. A large number of said discs are assembled in axially stacked relation in a filter casing, there being a seal between the inner peripheries of adjacent discs. The central apertures of the discs thus form a cylindrical opening which is sealed except for a connection to the filter casing outlet, and oil, or other liquid to be filtered, is introduced under pressure into the casing, but externally of the discs. Oil thus is forced through the filter rings of each disc by the pressure of the inlet to the lower pressure inside the discs, and thence through the spacer members to the central disc openings to the outlet. The discs are commonly preassembled in a cartridge which may conveniently be inserted into or removed from the casing as a unit.

The present invention relates most specifically to the formation and structure of the spacer members of the filter discs. In the past, considerable difficulty has been experienced in providing spacer members having all of the necessary and desirable functions and characteristics. They must be quite strong, so as to resist compression by the pressure drop across the filter, and so as to maintain the seals between the discs. They must prevent collapse of the fiter material rings against each other, as this would reduce the effective area of the filter. They must support the filter material along very closely spaced apart lines or areas, since otherwise the often substantial pressure drop across the filter material would cause localized failure or rupture of the filter material between its supports, said filter material being inherently comparatively weak and flimsy in structural strength. Finally, it is desirable that the internal body portion of the spacer, apart from those surface portions directly engaged by the filter sheets, be relatively open, and have relatively large passages, as compared to said surface portions. This prevents said body portion from obstructing fluid flow, and hence reducing filter capacity without corresponding increase of filter action, and also tends to prevent possible clogging of the filter. The principal object of the present invention is the provision of a filter disc construction which meets all of these requirements.

Generally, the filter disc contemplated by the present invention comprises a pair of annular rings of paper or the like secured together around their outer peripheral edges, and a foraminous spacer member interposed between said rings, said spacer member including an annular body ring of heavy sheet metal which is radially corrugated and radially tapered to its outer edge, and a pair of annular rings of welded wire screen disposed respectively at opposite sides of said sheet metal ring.

Other objects are simplicity and economy of construction, and efficiency and dependability of operation.

Figure 3:
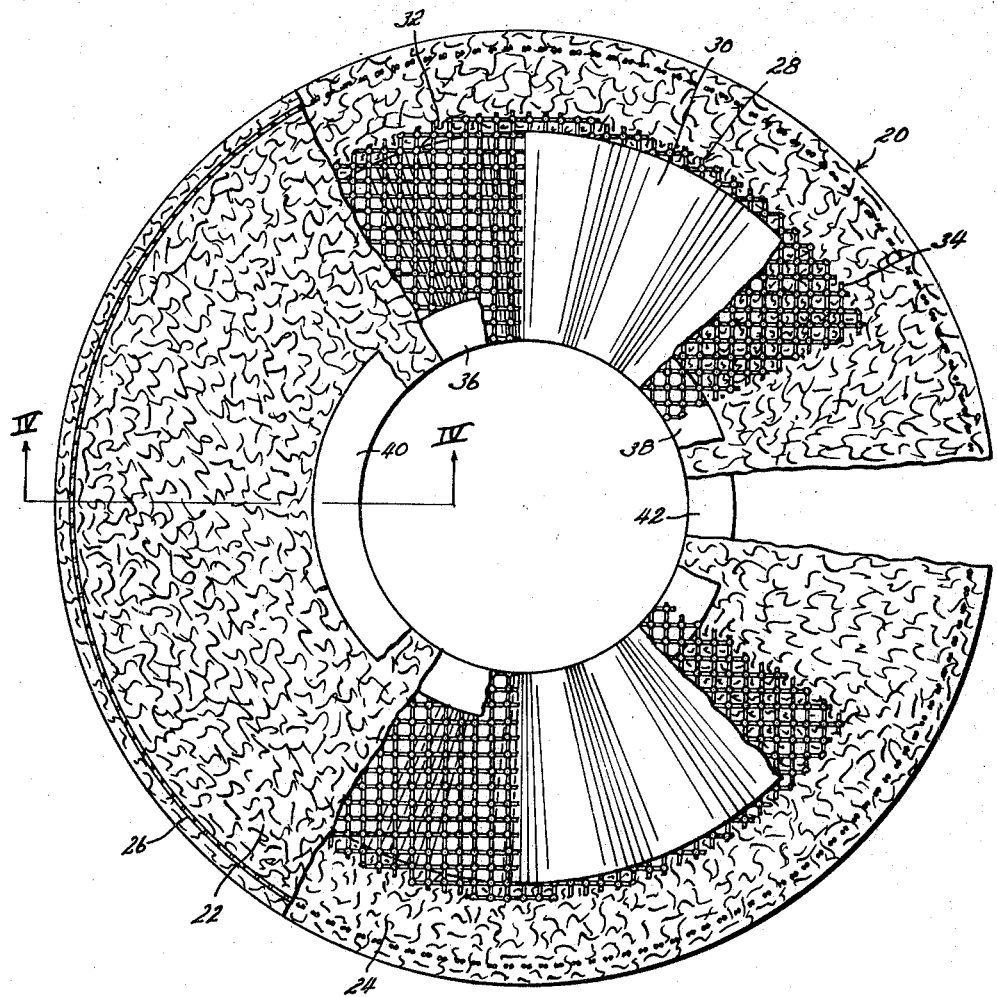
Figure 4:
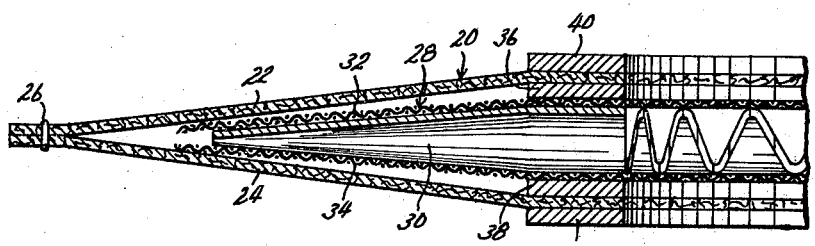

With these objects in view, as well as other objects which will appear in the course of the specification, reference will be had to the accompanying drawing, wherein:

FIG. 1 is an axial sectional view through a disc-type filter employing discs forming the subject matter of the present invention, with parts left in elevation and partially broken away, FIG. 2 is a sectional view taken on line II—II of FIG. 1, FIG. 3 is an enlarged face view of one of the filter discs, broken away to show the structural layers thereof, and FIG. 4 is an enlarged, fragmentary sectional view taken on line IV—IV of FIG. 3.

Like reference numerals apply to similar parts throughout the several views, and the numeral 2 applies to the casing of a disc-type filter, said casing being cylindrical with its axis disposed vertically, having a removable cap 4 sealed thereon by gasket 6 and removably secured in place by swing bolts 8. Said casing has a side inlet 10 for oil or other liquid to be filtered, and a bottom outlet 12 for filtered liquid. Said outlet is directly connected to, or may form a part of, a standpipe 14 rising vertically and axially in casing 2, being open at its upper end. Affixed to said standpipe adjacent the bottom of the casing is a radially extending flange 16, and the entire portion of the standpipe above said flange is perforated as shown.

Disposed in casing 2 is a filter cartridge 18 including a series of filter discs each indicated by the numeral 20, and forming the subject matter of the present invention. As best shown in FIGS. 3 and 4, each disc includes a pair of annular rings 22 and 24 of sheet filter material such as filter paper, felt or other material suitable for the particular filtering application intended. The outer peripheral edges of said paper rings are secured permanently together by any suitable means, such as stitching 26. The inner peripheral edges of the paper rings are spaced apart in a direction parallel to the axis of the disc. Thus the disc as a whole, the outer contour of which is defined by the paper discs, is taperingly reduced in thickness from its inner to its outer peripheral edges.

The paper discs 22 and 24 are supported in the relationship just described by a spacer member designated generally by the numeral 28, said spacer member being disposed between said paper rings and conforming generally to the space therebetween. Said spacer member consists, as shown, of a rigid body member 30 comprising an annular ring of sheet metal, said metal ring being radially corrugated, and being taperingly reduced in thickness from its inner to its outer periphery, and a pair of annular rings 32 and 34 of wire mesh, said mesh preferably being of the type wherein each wire is welded or otherwise affixed to each of the wires it intersects. Said wire mesh rings are disposed between paper rings 22 and 24, respectively overlying the opposite faces of sheet metal body ring 30. A pair of gaskets 36 and 38, of smaller diameter than the disc, are interposed respectively between paper ring 22 and screen ring 32, and between paper ring 24 and screen ring 34. Similarly, a pair of gaskets 40 and 42 are disposed to overlie respectively the outer surfaces of paper rings 22 and 24. The inner diameters of paper rings 22 and 24, spacer body ring 30, screen rings 32 and 34, and gaskets 36, 38, 40 and 42 are all equal, in order to facilitate their assembly as will be described.

A series of filter discs 20, all constructed as above described, are assembled to form a cartridge 18 by stacking them concentrically and coaxially between upper and lower end plates 44 and 46, said end plates being connected together by tie rods 48 extending through the central apertures of the discs and affixed at their ends to said end plates by any suitable means. Said end plates are also provided with central apertures large enough to engage over standpipe 14 of the filter case. Tie rods 48 form a circular pattern corresponding to the inner diameters of the discs, thereby insuring coaxial alignment both of the individual discs relative to each other, and of the various elements incorporated in each disc.

The filter cartridge 18, so assembled, is then lowered into case 2 over standpipe 14, cap 4 having been removed. Lower end plate 46 of the cartridge rests on flange 16 of the standpipe, a gasket 50 being interposed therebetween to seal the lower end of the central passage of the cartridge. The upper end of said passage is sealed by a disc 52 engaging upper end plate 44 of the cartridge, with a gasket 54 interposed therebetween. Disc 52 is urged downwardly, whereby to place the entire cartridge and all of its discs under axial compression, by a spring 56 interposed between disc 52 and a pressure plate 58 affixed to casing cap 4.

The general operation of the filter is believed self-evident. Oil or other liquid to be filtered is introduced into case 2 through inlet 10, at a higher fluid pressure than that existing in outlet 12. Thus, by virtue of the differential between the casing pressure outside of cartridge 18 and the pressure inside of said cartridge, the liquid is forced through filter paper rings 22 and 24 to the interiors of the individual discs 20, into the spacer members 28 of said discs, and thence into the central passage of the cartridge, where it enters standpipe 14 and flows to outlet 12. An important characteristic of this general type of filter arrangement, which in and of itself is not now, is that it provides a very large effective filter area in a relatively small case volume. However, as noted above, considerable difficulty has heretofore been experienced in providing a spacer member 28 adequate to support each disc against compression by the pressure differential, which could cause by-pass leakage of unfiltered liquid between the discs, to support the filter material rings 22 and 24 of each disc against being forced together by the pressure differential, with consequent loss of effective filter area, to support the inherently weak filter material with sufficient continuity to prevent localized failure or rupture thereof by the pressure, and to be sufficiently open or porous to prevent flow restriction thereby, or clogging thereof.

The present spacer member 28 largely satisfies all of the above requirements in a simple, economical and efficient manner. Said spacer member is of course foraminous, providing liquid flow passages throughout, and is formed entirely of metal for great strength. The radially corrugated body ring 30 can be formed of sufficiently heavy sheet metal to resist and prevent any appreciable compression thereof by external pressure on the disc, the gauge of the metal used being determined by the pressure at which the filter is designed to operate. Such compression could cause or permit separation between adjacent discs, particularly at localized points of the inner peripheries thereof, whereby unfiltered liquid could leak. The wire mesh rings 32 and 34, being seated directly on the body ring and being virtually incompressible at right angles to their planes, fully maintain the incompressibility of the body member.

The wire mesh rings 32 and 34 provide support for filter rings 22 and 24, said support being sufficiently continuous to prevent the localized failure or rupture of the filter rings which could otherwise occur from the liquid pressure, the paper, felt or other filter material being necessarily and inherently rather weak and flimsy in structural strength. The mesh size of the screen used will therefore be dependent to some degree on the nature of the filter material used, and the pressures involved. The wire mesh rings are in turn supported by body ring 30, bridging over the peaks of the corrugation convolutions of said body member. Obviously the screens must have sufficient bending strength to prevent their sagging or collapse into the body member convolutions. The spacing of the body member corrugations is thus dependent on the bending strength of the meshes, stronger meshes permitting wider corrugations, and weaker meshes requiring narrower corrugations. It is of course desirable that the radial flow passages provided by the corrugations of the body member be as free and open as possible, in order that the oil, once it has passed through the screens, can flow to the central outlet of the disc with as little flow resistance as possible, and to reduce any likelihood of clogging thereof. Internal gaskets 36 and 38 are supported with good continuity by the screen wire rings, and have been found desirable since in most cases the screen wire is of too large a mesh to provide adequate support for the filter paper layers to press the latter into good sealing contact with the adjacent discs, or with the external gaskets 40 and 42 disposed between said discs. The external gaskets serve primarily as spacers between the discs, reducing any possibility that confronting paper rings of adjoining discs could be forced together to reduce the effective areas of the discs. All of the gaskets are of a material which is relatively hard, firm and strong as compared to the paper or other filter material.

Spacer member 28 could be formed in different specific structures from that shown. Considered as a whole, the essential characteristics of the spacer, aside from its shape, are that it be strong and rigid under the pressures involved, that it have relatively small surface apertures, and that it have relatively large internal passages interconnecting both with the surface apertures and with the central opening of the disc. Assuming that the spacer is formed of a body member and overlying screens or the like, the required characteristics of the body member are its strength and rigidity, and large, open passages therein opening both through the faces thereof, and to its central opening. The overlying screens could have other forms than the welded wire mesh as shown, as for example a plain, unwelded wire mesh, or a perforated metal sheet. A wire mesh is preferable to a perforated metal sheet, since it provides a larger proportion of flow area therethrough than a perforated metal sheet, and hence contributes to a greater filter flow capacity. A welded wire mesh is preferable to a plain or unwelded wire mesh for at least two reasons. First, it provides a mesh having a greater flexural strength, for the same wire size, than an unwelded mesh. Second, it prevents unravelling or fraying of the edges of the screen rings when they are cut, and thereby eliminates any necessity of binding or otherwise securing said edges.

It is considered that all of the above variations of structure, as well as other minor changes of structure and operation, could be made without departing from the spirit of the invention as defined by the scope of the appended claims.

What I claim as new and desire to protect by Letters Patent is:

1. A filter disc comprising:
  (a) a pair of annular rings of sheet filter material secured concentrically together around their outer peripheral edges and having their inner peripheral edges spaced apart in a direction parallel to their common axis, whereby said filter rings converge radially from their inner to their outer peripheries, and (b) an annular spacer member conforming generally to the space between said filter rings and interposed therebetween, said spacer member comprising a body member constituting an annular disc of sheet metal which is radially corrugated so that it is taperingly reduced in thickness from its inner to its outer periphery, and a pair of planar annular perforated sheets overlying the opposite faces of said body member.

2. A filter disc as recited in claim 1 wherein each of said perforated sheets constitutes an annular disc of wire mesh.

3. A filter disc as recited in claim 2 wherein each of the wires of each of said wire mesh discs is welded to every other wire of said disc with which it intersects.

4. A filter disc as recited in claim 2 with the addition of a pair of annular gaskets corresponding in internal diameter to the internal diameters of said filter material rings, said spacer body and said wire mesh discs, and having an external diameter less than the external diameter of said spacer body, said gaskets being disposed respectively at the distal sides of said wire mesh discs, and at the confronting faces of said filter material rings.

References Cited

UNITED STATES PATENTS

| | | | |
|---|---|---|---|
| 1,746,409 | 2/1930 | Sweetland et al. | 210—486 X |
| 2,267,372 | 12/1941 | Calkins et al. | 210—499 X |
| 2,639,251 | 5/1953 | Kracklauer | 210—486 X |
| 2,813,632 | 11/1957 | Muller | 210—486 |
| 2,844,255 | 7/1958 | Cavenah et al. | |
| 2,887,230 | 5/1959 | Sicard | 210—486 X |

REUBEN FRIEDMAN, Primary Examiner

JOHN W. ADEE, Assistant Examiner

U.S. Cl. X.R.

210—489, 499